(No Model.)
J. J. HOOKER & B. W. PUTNAM.
TWINE HOLDER.
No. 520,312. Patented May 22, 1894.
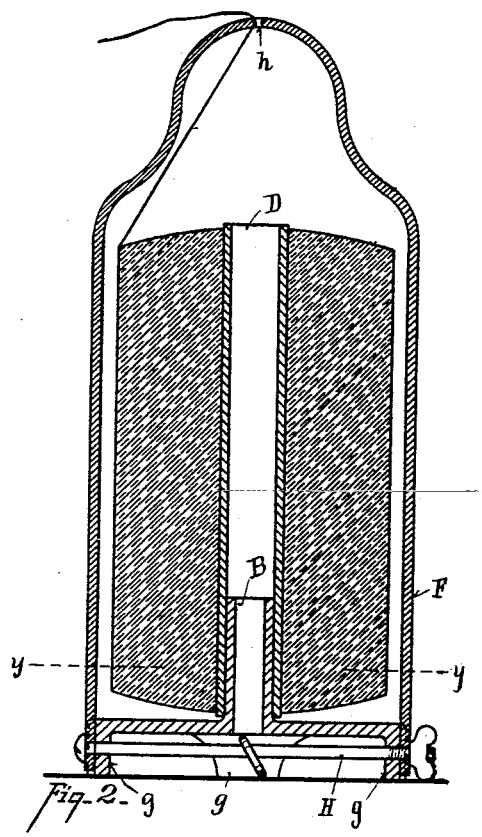
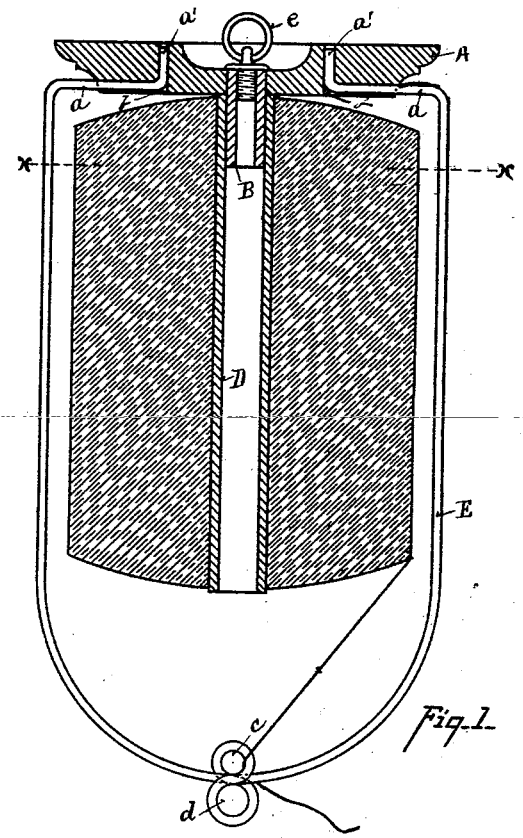
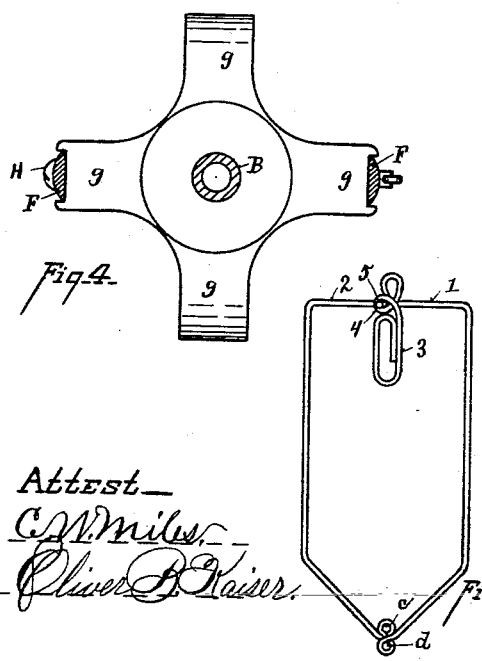
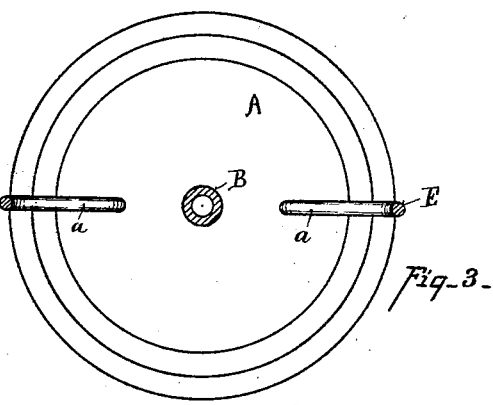
Attest—
C. W. Miles
Oliver B. Kaiser
Inventors—
J. J. Hooker & B. W. Putnam
By Wood & Boyd, attys

UNITED STATES PATENT OFFICE.

JAMES J. HOOKER AND BENJAMIN W. PUTNAM, OF CINCINNATI, OHIO.

TWINE-HOLDER.

SPECIFICATION forming part of Letters Patent No. 520,312, dated May 22, 1894.

Application filed March 3, 1894. Serial No. 502,222. (No model.)

*To all whom it may concern:*

Be it known that we, JAMES J. HOOKER and BENJAMIN W. PUTNAM, citizens of the United States, residing at Cincinnati, in the county of Hamilton and State of Ohio, have invented certain new and useful Improvements in Twine-Holders, of which the following is a specification.

Our invention relates to an improved twine holder; it is especially adapted to hold twine wound upon a hollow tube in the form of spools.

One of the objects of the invention is to provide a spool holder with a delivering eye over the center of the spool, the holder being adapted to be held in position either end up; thus, in practice it may be hung over a counter, or under a counter, or in any other desired position. The twine being wound upon a hollow tube it is easily held in position by the frictional engagement of the core of the tube with the supporting stud projecting over the base of the twine-holder.

Various features of our invention are fully set forth in the description of the accompanying drawings making a part of this specification, in which—

Figure 1 is a central vertical section of our improvement with the spool and twine in position for use. Fig. 2 is a modified form of twine holder. Fig. 3 is a section on line *x, x,* Fig. 1; Fig. 4 a section on line *y, y,* Fig. 2. Fig. 5 is an elevation of another modification of our improved twine-holder.

We have shown three different forms of twine holding frames.

D represents a straight cylindrical tube formed of wood, paper or other fibrous material, on which the twine is wound by a transverse motion. In each of the forms shown the twine-holder is composed primarily of the base and tube supporting stud, and the yoke frame springing from the base and spanning the spool of twine, with the twine delivering eye centrally over the spool, and means for suspending the frame either end up.

In the form shown in Fig. 1, A represents the base; B the spool supporting stud; E the yoke frame formed of wire, the free ends of which are firmly anchored in the base.

*a* represents shoulders formed by bending the wire at right angles to the feet *a'* which enter the base.

*b* represents a groove to receive the shoulders of the wire so as to stiffen the yoke frame and hold it in position against rotation. The bail portion of the frame is bent in the form of a figure 8, forming two eyes, *c* representing the delivery eye through which the twine is passed, and *d* an eye for suspending the twine holder.

When it is desired to suspend the twine-holder in the position shown in Fig. 1 a ring *e*, swiveled upon a stem secured to the bottom of the base, is provided. The loop portion of the yoke frame is sufficiently long to allow the spool of twine to be taken off of the stud without taking the frame apart.

In Fig. 2 the base is shown as made of metal and provided with feet *g*. The stud B supporting the twine holder is of the same form of construction as that shown in Fig. 1.

F represents the yoke frame made of material having a plane face bent into the desired form, and detachably secured to the base by the tie-rod H, which passes through both feet of the yoke frame. The eye *h* for delivering the twine is pierced through the bail portion centrally over the spool. The ring *e'* for suspending the twine holder is attached to the tie rod, and if desired a ring or hanging loop may be attached to the opposite end of the frame, but it is not necessary as the twine holder may be suspended by the bail itself. The outer face of the frame F is oval as shown in Fig. 4.

In the form shown in Fig. 5 the entire frame is made of one piece of wire bent into desired form; the base being formed of the shoulders 1, 2; 3 representing the spool holding stud formed by bending loops in the wire; 4 representing an eye formed at one end of the loop stud 3.

5 represents a hook formed on the end of the shoulder 2 engaging with the eye. In the bail portion of said yoke frame are formed eyes *c, d,* of the same character and for the same purpose as those shown in Fig. 1.

Several advantages arise from the use of either form of twine holder herein shown. First, by winding the twine on the hollow tube the spool will be held firmly in position by the frictional engagement of the inner bore of the tube with the stud, and being cylindrical in form it is not liable to slip off when thus held in position with the delivering eye downward. Second, the spool is firmly held stationary in a non-rotating position, hence, the twine will be delivered under strain only so fast as tension is applied, and it is thus prevented from snarling or kinking. Third, when the twine is wound transversely across the barrel of the tube, which is the preferred form of winding, it will be delivered with less tension than when the ordinary spiral or close form is employed.

In the form shown in Fig. 2 the spool may be removed and inserted on the holding stud by detaching the yoke-frame from the base; in the form shown in Fig. 5, the limbs will spring enough to allow the ready removal of the twine spool.

Having described our invention, what we claim is—

1. A twine holder composed substantially of a base, a spool supporting stud, a detachable tube upon which the twine is wound, adapted to engage with said stud, a yoke frame extending from opposite sides of the base, spanning the spool of twine and provided with a delivery eye centrally over the axis of the spool, and means for suspending the twine holder either end uppermost substantially as described.

2. A twine holder composed of a base, a yoke frame springing from said base, and spanning a spool, and twine, and provided with a delivery eye $c$, and a suspending eye $d$, formed by bending of the wire forming the yoke frame, substantially as described.

3. A twine holder composed of the cylindrical tube D, in combination with the frame, provided with the supporting stud attached to the base thereof, a yoke frame extending from the base and spanning the spool and twine, provided with a delivery eye centrally over the axis of the spool, and the suspending ring attached to the base of the holder, substantially as described.

In testimony whereof we have hereunto set our hands.

JAMES J. HOOKER.
BENJ. W. PUTNAM.

Witnesses:
W. R. WOOD,
E. P. HARRISON,
W. BODEMER.